(12) United States Patent
Watson (10) Patent No.: US 9,979,554 B2
(45) Date of Patent: May 22, 2018

(54) METHODS AND SYSTEMS FOR SECURELY ACCESSING LINE REPLACEABLE UNITS

(71) Applicant: Panasonic Avionics Corporation, Lake Forest, CA (US)

(72) Inventor: Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 208 days.

(21) Appl. No.: 14/992,267

(22) Filed: Jan. 11, 2016

(65) Prior Publication Data

US 2017/0201386 A1   Jul. 13, 2017

(51) Int. Cl.
*H04L 29/06* (2006.01)
*H04L 9/32* (2006.01)
*H04L 9/08* (2006.01)
*H04W 12/04* (2009.01)

(52) U.S. Cl.
CPC .......... *H04L 9/3271* (2013.01); *H04L 9/0866* (2013.01); *H04L 63/06* (2013.01); *H04W 12/04* (2013.01)

(58) Field of Classification Search
None
See application file for complete search history.

(56) References Cited

U.S. PATENT DOCUMENTS

| 7,673,141 B2 * | 3/2010 | Kilian-Kehr | H04L 63/0869 713/168 |
|---|---|---|---|
| 8,230,231 B2 | 7/2012 | Freeman et al. | |
| 9,787,661 B2 * | 10/2017 | Naslund | G06F 21/602 |
| 2003/0039361 A1 * | 2/2003 | Hawkes | G06F 21/10 380/278 |
| 2005/0030151 A1 | 2/2005 | Singh | |

(Continued)

FOREIGN PATENT DOCUMENTS

WO   WO2014/165284   10/2014

OTHER PUBLICATIONS

Stephens, Bob. Security Architecture for Aeronautical Networks. The 23rd Digitial Avionics Systems Conference. DASC 04. Pub. Date: 2004. http://ieeexplore.ieee.org/stamp/stamp.jsp?tp=&arnumber=1390774.*

(Continued)

*Primary Examiner* — Jeremiah Avery
(74) *Attorney, Agent, or Firm* — Klein, O'Neill & Singh, LLP (57) ABSTRACT

Methods and systems for securely accessing a transportation vehicle are provided. As an example, one method includes obtaining user specific secret information from a key server with a user device, without providing the user access to the user specific secret information; securely storing the user specific secret information in a memory of the user device; generating a challenge message for the user device with an LRU, the challenge message generated by the LRU using the user specific secret information also stored at the LRU and optionally an identifier identifying the LRU; generating a response to the challenge message by the user device using any user specific secret information and the challenge message; providing the response to the LRU; and validating the response by the LRU using any user specific secret information and the challenge message for authorizing access to the LRU by the user device.

20 Claims, 7 Drawing Sheets

(56) References Cited

U.S. PATENT DOCUMENTS

| | | | | |
|---|---|---|---|---|
| 2005/0050322 | A1* | 3/2005 | Mizrah | H04L 9/0822 713/168 |
| 2006/0137015 | A1* | 6/2006 | Fahrny | H04N 7/17318 726/26 |
| 2009/0259838 | A1* | 10/2009 | Lin | H04L 9/3271 713/150 |
| 2010/0098243 | A1 | 4/2010 | Chopart | |
| 2011/0225417 | A1* | 9/2011 | Maharajh | G06F 21/10 713/150 |
| 2015/0095648 | A1* | 4/2015 | Nix | H04W 4/70 713/170 |
| 2016/0098723 | A1* | 4/2016 | Feeney | G06Q 20/4016 705/75 |
| 2016/0162897 | A1* | 6/2016 | Feeney | G06Q 20/4014 705/71 |

OTHER PUBLICATIONS

Eskicioglu, Ahmet M.; Delp, Edward J. A Key Transport Protocol Based on Secret Sharing Applications to Information Security. IEEE Transactions on Consumer Electronics. vol. 48, Issue: 4. Pub. Date: 2002. http://ieeexplore.ieee.org/stamp/stamp.jsp?tp=&arnumber=1196407.*

Au, Man Ho; Liu, Joseph K.; Fang, Junbin; Jiang, Zoe L.; Susilo, Willy; Zhou, Jianying. A New Payment System for Enhancing Location Privacy of Electric Vehicles. IEEE Transactions on Vehicular Technology. vol. 63, Issue: 1. Pub. Date: 2014. http://ieeexplore.ieee.org/stamp/stamp.jsp?tp=&arnumber=6566195.*

"Challenge-Handshake Authentication Protocol", Wikipedia, https://en.wikipedia.org/wiki/Challenge-Handshake_Authentication_Protocol, Sep. 30, 2015.

"HMAC-based One-time Password Algorithm", Wikipedia, https://en.wikipedia.org/wiki/HMAC-based_One-time_Password_Algorithm, Oct. 10, 2015.

"S/KEY", Wikipedia, https://en.wikipedia.org/wiki/S/KEY, Oct. 26, 2015.

"Time-based One-time Password Algorithm", Widipedia, https://en.wikipedia.org/wiki/Time-based_One-time_Password_Algorithm, Oct. 14, 2015.

"SafeWord Platinum—hardware token Series", CBS Interactive Inc., http://www.cnet.com/products/safeword-platinum-hardware-token-series/.

"SafeWord Authenticators", *SafeNet Adminstration Guide*, p. 2, SafeNet, Inc., 2011.

Extended European Search Report from EPO dated Mar. 31, 2017 for related EP Application No. 16207362.1.

* cited by examiner

METHODS AND SYSTEMS FOR SECURELY ACCESSING LINE REPLACEABLE UNITS

COPYRIGHT NOTICE

A portion of the disclosure herein contains material to which a claim for copyrights may be made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to vehicles and more particularly, to secured access to line replaceable units (LRUs) on vehicles.

BACKGROUND

Transportation vehicles, for example, aircrafts, trains, buses, recreation vehicle, boats and other similar vehicles use various components (may be referred to as LRUs) for providing various functions, including entertainment content, control systems and others. These devices include hardware (for example, servers, switches, network interface cards, storage adapters, storage devices and others) and software (for example, server applications, operating systems, firmware, management applications, application programming interface (APIs) and others). Often LRUs have to be serviced and updated while a vehicle may be in transit. It is desirable to have an efficient but secure system to access LRUs.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), solid state memory device or any other storage device, in accordance with the claimed subject matter.

In one aspect, methods and systems for securely accessing line replaceable units (LRUs) at a transportation vehicle are provided. As an example, one method includes connecting a user device to a key server; obtaining user specific secret information from the key server by the user device, without providing access to the user specific secret information to the user; securely storing the user specific secret information in a memory of the user device; generating a challenge message for the user device by a line replaceable unit (LRU) of a transportation vehicle, the challenge message generated by the LRU using the user specific secret information also stored at the LRU and optionally an identifier identifying the LRU; generating a response to the challenge message by the user device using a user identifier, the user specific secret information and the challenge message; providing the response to the LRU; and validating the response by the LRU using the user identifier, the user specific secret information and the challenge message for authorizing access to the LRU by the user device.

Figure 1A:
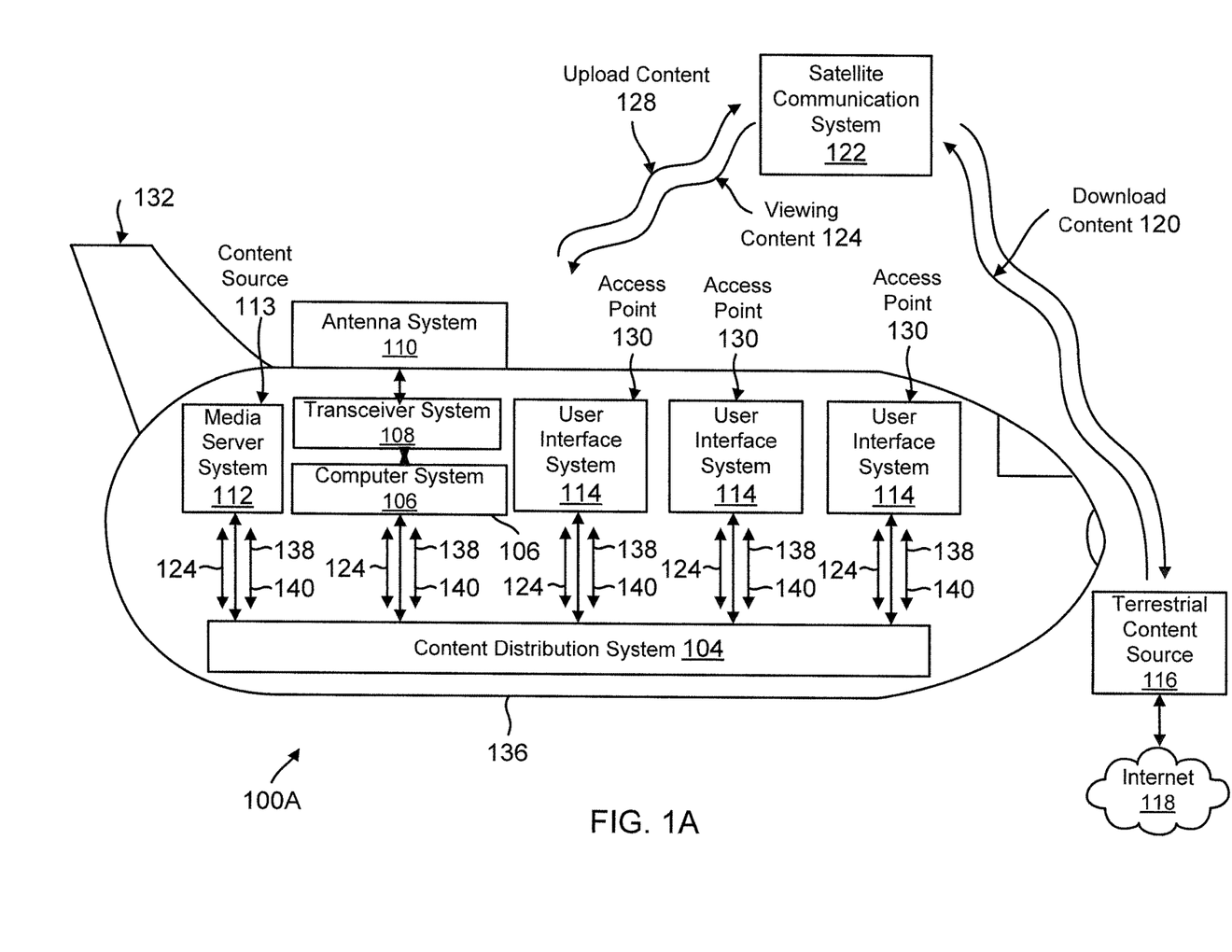
FIG. 1A shows an example of an operating environment for implementing the various aspects of the present disclosure in an aircraft.

Vehicle Information System: FIG. 1A shows an example of a vehicle information system 100A (also referred to as system 100A) that can be configured for installation aboard an aircraft 132, according to one aspect of the present disclosure. When installed on an aircraft, system 100A can comprise a conventional aircraft passenger in-flight entertainment (IFE) system, such as the Series 2000, 3000, eFX, and/or eX2 in-flight entertainment system as manufactured and provided by Panasonic Avionics Corporation (without derogation of any trademark rights of Panasonic Avionics Corporation) of Lake Forest, Calif.

System 100A comprises at least one conventional content source 113 and one or more user (or passenger) interface systems 114 that communicate with a real-time content distribution system 104. The content sources 113 may include one or more internal content sources, such as a media server system 112, that are installed aboard the aircraft 132 and/or one or more remote (or terrestrial) content sources 116 that can be external from the aircraft 132. The media server system 112 can be provided as an information system controller for providing overall system control functions for system 100A and/or for storing viewing content 124, including pre-programmed viewing content and/or downloaded viewing content 120, as desired. Exemplary viewing content 124 can include television programming content, music content, podcast content, photograph album content, audiobook content, and/or movie content without limitation. The exemplary viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive download viewing content 120 from a selected terrestrial content source 116 and/or transmit upload viewing content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially integrated.

The user interface system 114 may be computing terminals that are accessed via access point 130. The user interface system 114 provides a display device to view content. The user interface system 114 includes a hardware interface to connect to the access point 130 that provides a wired and/or a wireless connection for the user interface system.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, payment information likewise can be entered via the input system. The input system can be provided in any conventional manner and typically includes one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements. Details of the user interface system 114 are not germane and hence have not been provided herein.

Figure 1B:
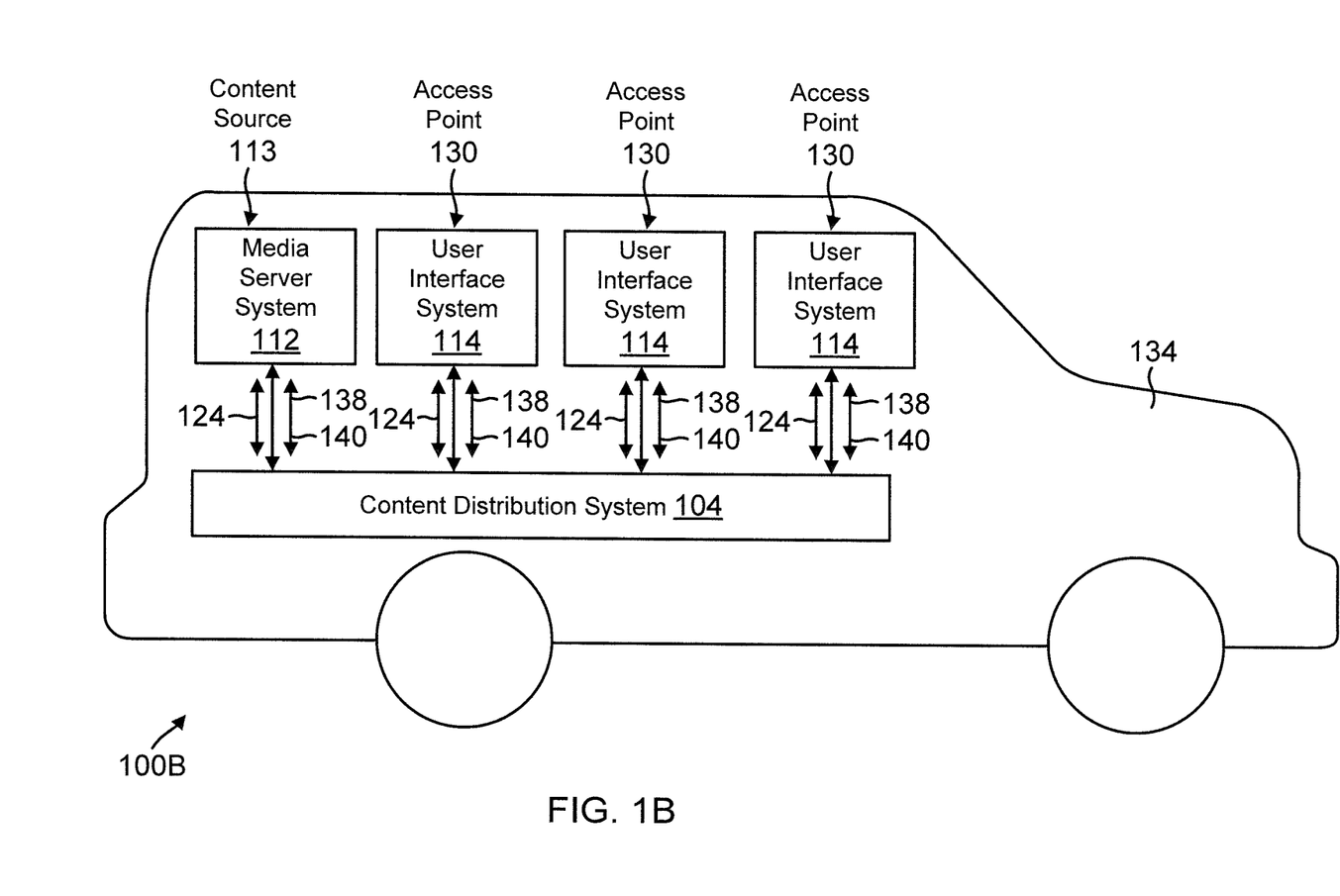
FIG. 1B shows another example of the operating environment at another vehicle, according to one aspect of the present disclosure.

FIG. 1B shows an example of implementing the vehicle information system 100B (may be referred to as system 100B) on an automobile 134 that may include a bus, a recreational vehicle, a boat, and/or a locomotive, or any other type of passenger vehicle without limitation. The various components of system 100B may be similar to the components of system 100A described above with respect to FIG. 1A and for brevity are not described again.

Figure 2:
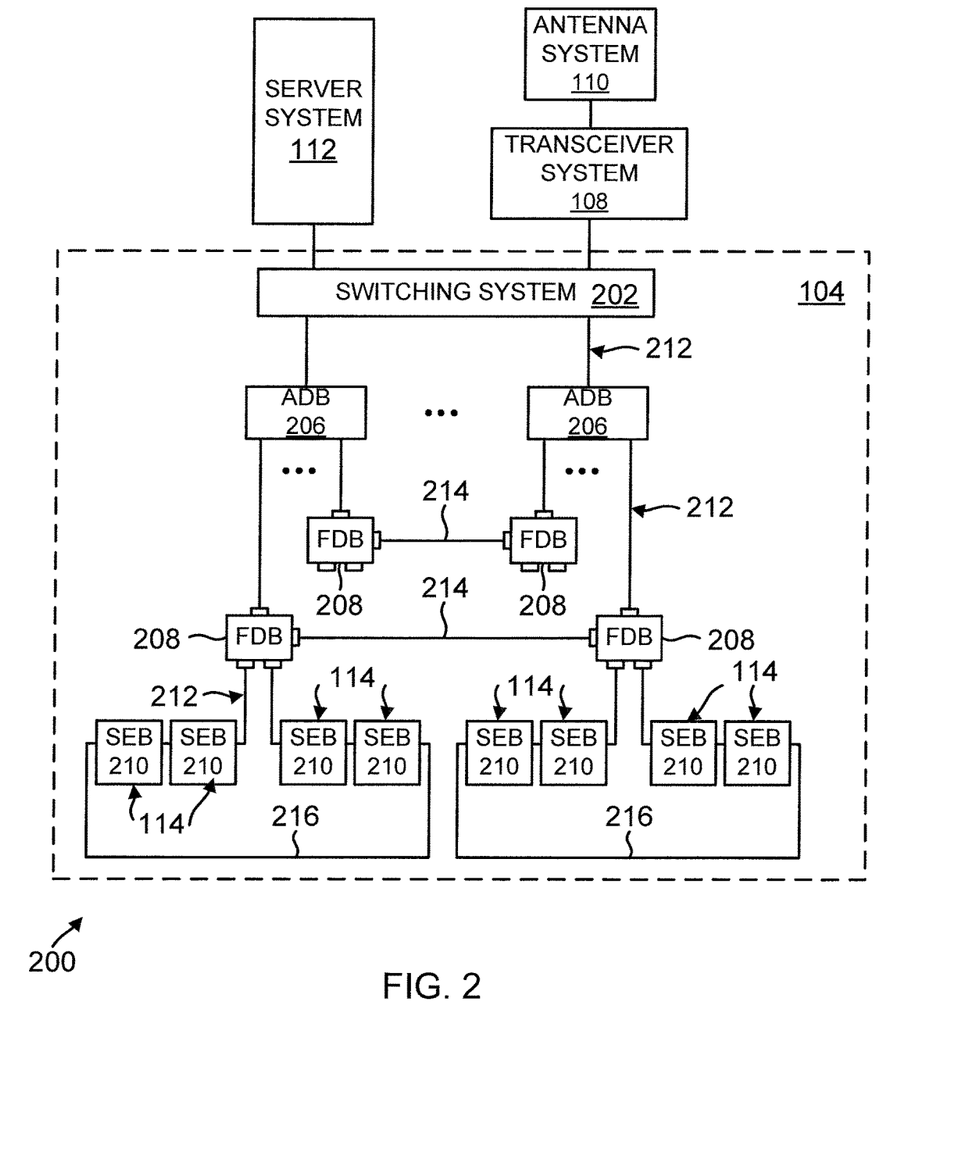
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as LRUs. The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

To maintain and upgrade LRUs on a transportation vehicle or similar environment, one has to access the LRU securely to avoid security breaches. Conventional secured authentication systems typically use One Time Passwords (OTPs) that rely on synchronized time (TOTP), passwords relying on synchronized counters (HOTP) or previously assigned passwords (S/Key). Conventional systems have shortcomings because LRUs in a transportation vehicle may be potentially disconnected and unable to synchronize. To a user authenticating to the LRU, a corporate network connection, for example, an Intranet, may not be available in certain environments, including when on an aircraft at an airport that may restrict use of electronic devices due to aircraft security regulations. In other instances cellular service may not be available on aircraft due to location. The various aspects of the present disclosure overcome the limitations of conventional authentication systems, as described below.

In one aspect, methods and systems are provided that enable a service technician to access a user account on a LRU by reducing vulnerability to hackers. As described below in detail, a user password or a user secret is never provided to the user and instead is stored securely both on the user device, the LRU and a key server and can only be accessed securely.

Figure 3:
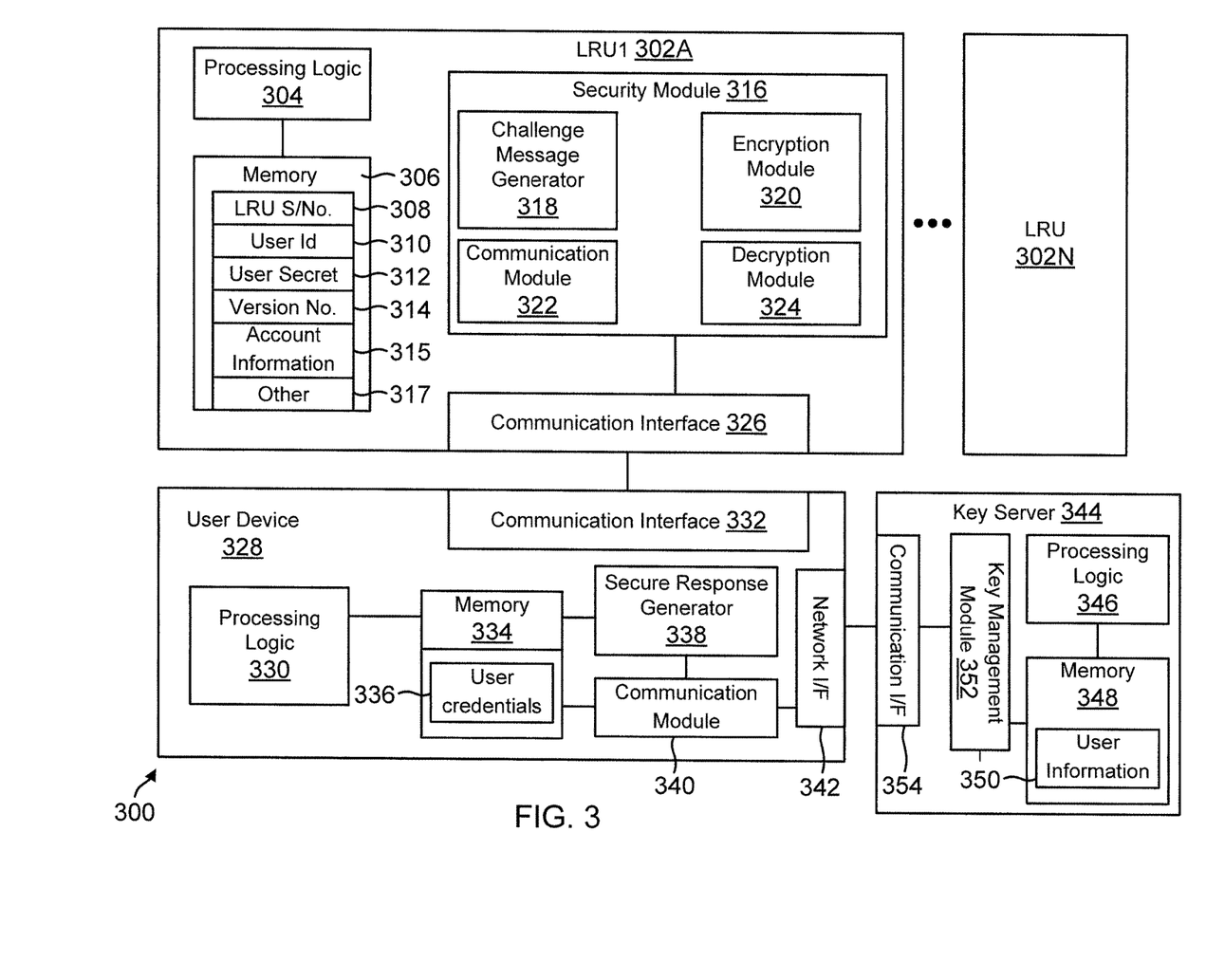
FIG. 3 shows an example of a system for secured access to LRUs, according to one aspect of the present disclosure.

Secured Access System 300: FIG. 3 shows a system 300 for securely accessing a LRU, according to one aspect of the present disclosure. In one aspect, system 300 uses a modified Challenge-Handshake Authentication Protocol (CHAP) for enabling the secured access, as described below in detail.

System 300 shows a plurality of LRUs 302A-302N (may also be referred to as LRU or LRUs 302). LRU 302A includes processing logic 304 executing instructions from a memory 306. The memory 306 may be non-volatile memory that is used to store LRU and user information. In one aspect, memory 306 stores a LRU serial number 308, a user identifier (referred to herein as user ID) 310 that uniquely identifies a user and a user secret 312 that is assigned to a specific user for accessing a specific user account 315. A version number 314 may also be stored indicating a version number for user secret 312. The memory 317 may store other information based on the system 300 operating environment.

In one aspect, the user ID and the user secret may be protected using a shared system level secret that may a 256 character random value. The system level secret information may be stored at a factory installed hardware security module (HSM) (not shown) in the LRU, or stored in memory 306 in an obfuscated form (for example, using a Rotate-N process and then flipping bits for storing the system secret information).

In one aspect, at least the user information (310, 312 and 315) may be stored as 256 character random values within a shadow file and may be XOR-encrypted with the LRU secret information.

LRU 302A includes a security module 316 that may be implemented in hardware, software or a combination thereof. The security module 316 includes an encryption module 320 that is used to encrypt and store at least the user ID 310 and user secret 312. The decryption module 324 is used to decrypt the encrypted information.

In one aspect, the security module 316 also includes a challenge message generator 318 that generates a random number as a challenge for the user. The random number may be generated by using the time currently available (current time), system uptime, and the LRU serial number. The challenge message generator 318 includes a random generator that uses these values as a seed for generating a random number. A certain number of digits are extracted from the random number, for example, 8. The challenge message is then presented to a user device 328 via a communication module 322 using a communication interface 322. The various aspects of the present disclosure are not limited to any specific interface and do allow for no connection between the user device and the LRU 302A, since often the LRU 302A is in a physically inaccessible location.

The user device 328 also has a communication interface 332 that communicates information to the user for entry into the LRU 302A. User device 328 includes processing logic 330 having access to memory 334. The memory 334 stores user secrets 336, as described below. In one aspect, the user device includes a secure response generator 338 that generates a response to the challenge message from LRU 302A as manually entered by the user on their device 328 as described below in detail.

In one aspect, the user device 328 includes a communication module 340 to connect to a key server 344 via a network interface 342, for example, a network interface card, a Wi-Fi card or any other device. The key server 344 includes processing logic 346 that has access to memory 348. The memory 348 may store encrypted user information 350 that includes user account information, a user ID and a user secret that is associated with the user ID and/or the user account. The key management module 352 manages the stored information and provides it to the user device 328 via the communication interface 354. The communication interface 354 includes logic and circuitry to communicate with network interface 342 using any network protocol, including Ethernet, Wi-Fi and others.

Figure 4A:
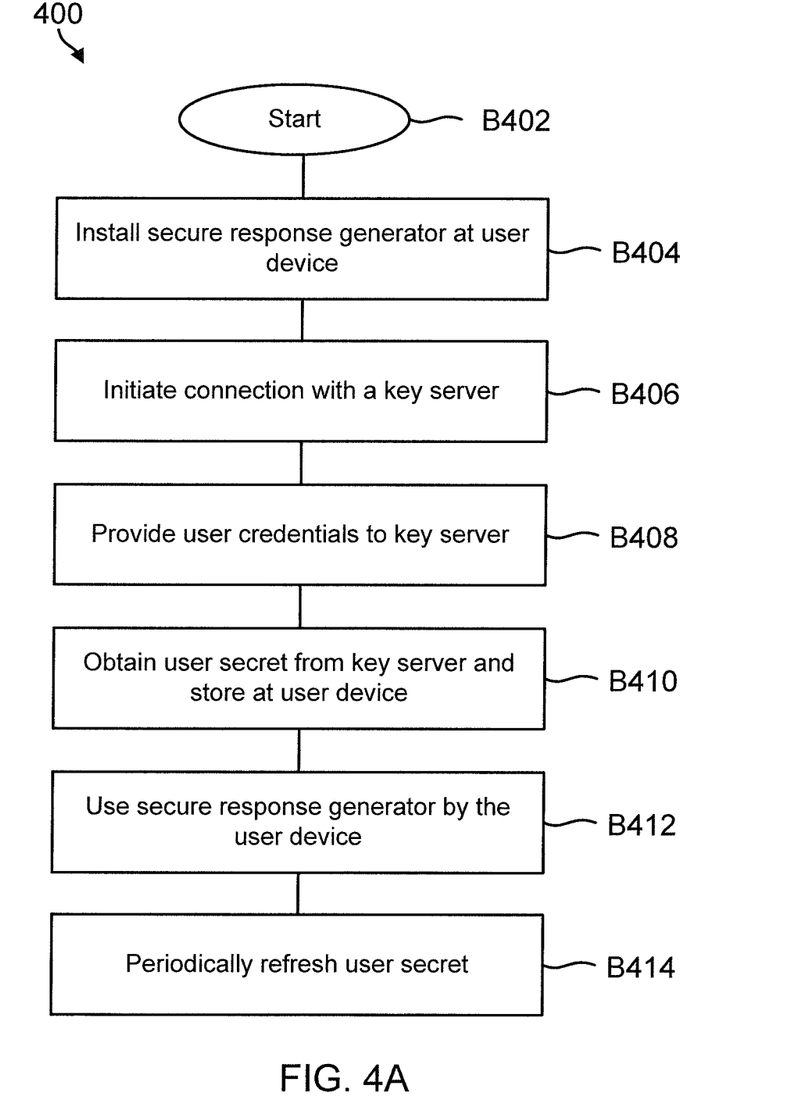
FIG. 4A shows a process for enabling a user device to access a LRU, according to one aspect of the present disclosure.

Process Flows: FIG. 4A shows a process 400 for enabling a user to securely access a LRU, according to one aspect of the present disclosure. The process starts in block B402, when the user device 328 is started and powered on. In block B404, the secure response generator 338 is installed. In one aspect, the secure response generator 338 is a processor executable application, the instructions for which are stored in memory 334.

In block B406, a connection with the key server 344 is initiated. In one aspect, the connection is established when the user device is not on the transportation vehicle, and a secure network connection is available with the key server 344.

In block B408, the user device 328 communicates user credentials, i.e., a user ID and a password or any other type of authentication to log into the key server 344. The user information is transmitted via network interface 342. In one aspect, the information is transmitted using encrypted packets.

In block B410, the key server 344 authenticates the user and obtains user information 350 including the user secret. The user secret is then encrypted and provided to the user device 328. The user itself never sees the user secret. The user secret is stored as 336 in memory 334. Thereafter, in block B412, the user secret is ready to be used to access LRU 302A.

It is noteworthy that the user secret stored at user device 328 may have an expiration date and thus may have to be refreshed periodically in block B414. To refresh the user secret, the user device 328 is periodically connected to the key server 344 to obtain the latest user secret. The same information is also provided to the LRU 302A. Preferably, the user secret must be refreshed at least as frequently as every ninety calendar days. For greater security, the refresh period may be more frequently, such as every thirty or sixty calendar days.

Figure 4B:
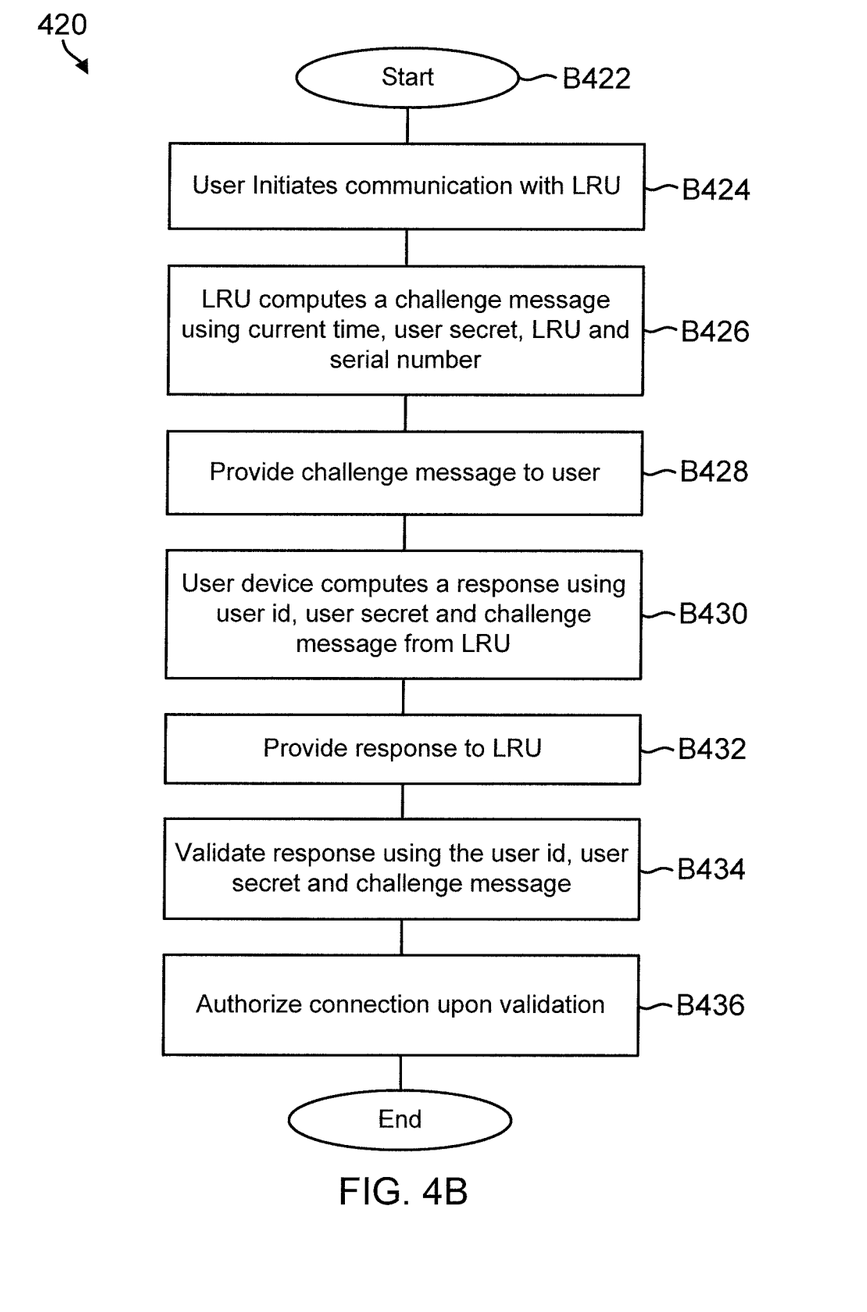
FIG. 4B shows a process flow for securely accessing a LRU, according to one aspect of the present disclosure.

FIG. 4B shows a process 420 for using the user device 328 to securely access LRU 302A, according to one aspect of the present disclosure. The process begins in block B422, after the user device 328 has stored the user secret in memory 334. The user initiates connection with the LRU 302A in block B424. The communications enables the user to input a user Id and/or a user account name. In block B426, the challenge message generator 318 generates a challenge message using at least current time, and the user secret. Preferably, the challenge message is generated also using the LRU serial number for greater security. More preferably and for even greater security, other information is included as well in generating the challenge message, such as the LRU version and/or software version.

The challenge message is provided to the user in block B428. In an alternative embodiment, it may be possible for the user device 328 to communicate with the LRU 302A via BLUETOOTH or other wireless communication protocol, e.g., an ad-hoc Wi-Fi connection, or via a cable to avoid the necessity of manual entry of information by the user into the user device 328 and LRU 302A.

In block B430, the user device 328 computes a response. As an example, the response may be generated using SHA256 using the concatenated values of the user Id string values, the user-specific secret, and the challenge message provided by the LRU in block B428. The last 8 decimal digits are extracted using a 'mod 100,000,000' operation or simply the last 8 characters of its decimal representation:

$$\text{SHA256 (userid+user-secret+challenge) mod } 10^8$$

The SHA (Secure Hash Algorithm) is an example of cryptographic hash functions. A cryptographic hash is like a signature for a text or a data file. The SHA-256 algorithm generates a unique, fixed size 256-bit (32-byte) hash.

The user provides the response to the LRU in block B434. The LRU security module 316 validates the response by using the user ID, user secret and the challenge message. If the response is valid, then the access attempt is authorized in block B436. Thereafter, the process ends.

In an alternate embodiment, the user employs the user device 328 to contact a server, e.g., a corporate server, accessible via a virtual private network (VPN) using a conventional web browser on the user device 328. After the user receives a challenge message from the LRU 302A in Block 428 of FIG. 4, the user provides the challenge message to the server using a web browser, whereupon the server computes the response as described previously and presents it in a web page to the user. The communication through the web browser is secure as it is conducted via the VPN and requires the user to provide proper credentials or authentication, e.g., user name and password. After receipt of the response from the server, the user enters the response into the LRU 302A. This provides an alternative way for a service technician to access the LRU 302A, employing a user device 328 in which the software for generating a response to a challenge message is installed on the server.

For additional security, the LRU 302A includes a time limit, e.g. one minute, by when a proper response must be entered after a challenge message is presented. In addition, after two or more incorrect responses have been entered, the LRU 302A imposes a waiting period before access may be attempted again of at least ten minutes. After five or more incorrect responses have been entered in a row, the LRU 302A may require a reset password to be entered before a user is allowed access.

In one aspect, the methods and systems described herein have numerous advantages over conventional authentication mechanisms. The foregoing processes and systems do not expose user secret information and when an employee leaves there is reduced security risk. The systems and processes also operate efficiently in a transportation vehicle where network connectivity via the Internet or cellular modes are not always available.

Figure 5:
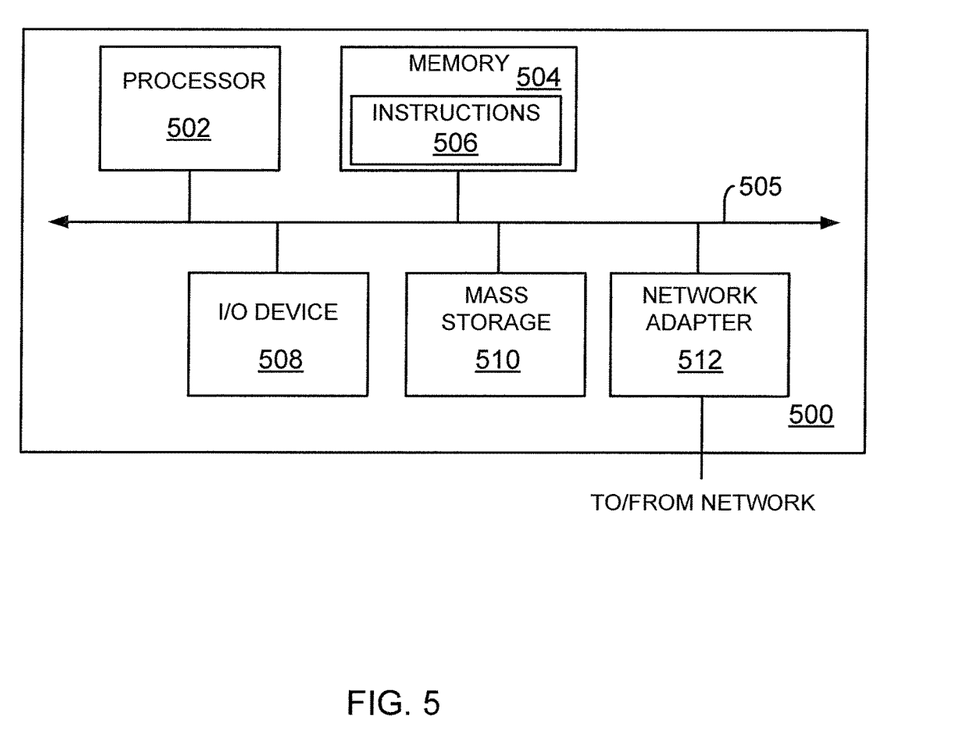
FIG. 5 shows an example of a hardware based, processing system, according to one aspect of the present disclosure.

Processing System: FIG. 5 is a high-level block diagram showing an example of the architecture of a processing system 500 that may be used according to one aspect. The processing system 500 can represent LRU 302, user device 328, media server system 112, computing system 106, user interface system 114, key server 344 or any user device that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 4A and 4B described above as well as the logic used by the LRU 302A and/or user device 328. Memory 504 may also be used to store the various modules or FIG. 3.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks.

The network adapter 512 provides the processing system 500 with the ability to communicate with remote devices (e.g., over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

References to values or numerals having a quantity of characters, bits, or bytes, is intended to be the minimum required with conventional computing devices to provide adequate security. As will be appreciated, the required quantity may be increased for greater security at the cost of increasing the burden on computational devices. However, as computer processing ability increases with improved technology, a higher quantity may be employed without undue burden.

A method and apparatus for secured access to a LRU on a vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art. References to storage and memory, may mean the information or data stored "in", "on", and/or "at" the memory.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
obtaining user specific secret information of a user from a key server by a user device using a secure connection, without providing access to the user specific secret information to the user;
securely storing the user specific secret information in a memory of the user device without exposing the user specific secret information to the user;
generating a challenge message for the user device from a line replaceable unit (LRU) of a transportation vehicle, the challenge message generated by the LRU using the user specific secret information also stored at the LRU, any other user specific information also being stored in the LRU, and optionally an identifier identifying the LRU;
generating a response to the challenge message by the user device using the user specific secret information stored at the user device and the challenge message received from the LRU;
providing the response to the LRU; and
validating the response by the LRU using the user specific secret information stored at the LRU and the challenge message for authorizing access to the LRU by the user device.

2. The method of claim 1, wherein the transportation vehicle is an aircraft and the LRU is part of an in-flight entertainment system.

3. The method of claim 1, wherein the key server, the LRU and the user device encrypt the user specific secret information using a shared system key.

4. The method of claim 1, wherein the response is generated by the user device using a secure hash algorithm.

5. The method of claim 1, wherein the key server authenticates the user device before providing the user specific secret information to the user device.

6. The method of claim 1, wherein the LRU also uses a current time and a system time for generating the challenge message.

7. The method of claim 1, wherein the identifier identifying the LRU is at least one of a LRU serial number, LRU version, and LRU software version.

8. A non-transitory, machine readable medium having stored thereon instructions comprising machine executable code which when executed by a machine, causes the machine to:
- connect a user device in secure communication with a key server;
- obtain user specific secret information of a user from the key server by the user device, without providing access to the user specific secret information to the user;
- securely store the user specific secret information in a memory of the user device without exposing the user specific secret information to the user;
- generate a challenge message for the user device from a line replaceable unit (LRU) of a transportation vehicle, the challenge message generated by the LRU using the user specific secret information also stored at the LRU and optionally an identifier identifying the LRU;
- generate a response to the challenge message by the user device using the user specific secret information stored at the user device and the challenge message received from the LRU;
- validate the response provide by the user to the LRU using the user specific secret information stored at the LRU and the challenge message for authorizing access to the LRU by the user device.

9. The non-transitory, machine readable medium of claim 8, wherein the transportation vehicle is an aircraft and the LRU is part of an in-flight entertainment system.

10. The non-transitory, machine readable medium of claim 8, wherein the key server, the LRU and the user device encrypt the user specific secret information using a shared system key.

11. The non-transitory, machine readable medium of claim 8, wherein the response is generated by the user device using a secure hash algorithm.

12. The non-transitory, machine readable medium of claim 8, wherein the key server authenticates the user device before providing the user specific secret information to the user device.

13. The non-transitory, machine readable medium of claim 8, wherein the LRU also uses a current time and a system time for generating the challenge message.

14. The non-transitory, machine readable medium of claim 8, wherein the identifier identifying the LRU is at least one of a LRU serial number, LRU version, and LRU software version.

15. A system, comprising:
- a line replaceable unit (LRU) of a transportation vehicle having a processor module and a memory containing machine readable medium comprising machine executable code;
- a user device having a processor module and a memory containing machine readable medium comprising machine executable code; and
- a key server having a having a processor module and a memory containing machine readable medium comprising machine executable code:
- wherein the user device securely communicates with the key server to obtain user specific secret information of a user, without providing access to the user specific secret information to the user; and securely stores the user specific secret information in the memory of the user device; and
- wherein when a user attempts to gain access to the LRU, the LRU generates a challenge message for the user device using the user specific secret information also stored in the LRU and optionally an identifier identifying the LRU; and the user device generates a response to the challenge message using a user identifier, the user specific secret information stored at the user device and the challenge message received from the LRU, and provides the response to the LRU that validates the response using the user specific secret information stored at the LRU and the challenge message for authorizing access to the LRU by the user device.

16. The system of claim 15, wherein the transportation vehicle is an aircraft and the LRU is part of an in-flight entertainment system.

17. The system of claim 15, wherein the key server, the LRU and the user device encrypt the user specific secret information using a shared system key.

18. The system of claim 15, wherein the response is generated by the user device using a secure hash algorithm.

19. The system of claim 15, wherein the key server authenticates the user device before providing the user specific secret information to the user device.

20. The system of claim 15, wherein the LRU also uses a current time and a system time for generating the challenge message, and the identifier identifying the LRU is at least one of a LRU serial number, LRU version, and LRU software version.

* * * * *